United States Patent
Kaneko

(10) Patent No.: US 11,842,090 B2
(45) Date of Patent: Dec. 12, 2023

(54) IMAGE FORMING APPARATUS, METHOD OF CONTROLLING IMAGE FORMING APPARATUS, AND STORAGE MEDIUM

(71) Applicant: CANON KABUSHIKI KAISHA, Tokyo (JP)

(72) Inventor: Takayuki Kaneko, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/172,215

(22) Filed: Feb. 21, 2023

(65) Prior Publication Data

US 2023/0266927 A1      Aug. 24, 2023

(30) Foreign Application Priority Data

Feb. 24, 2022   (JP) .................... 2022-026525

(51) Int. Cl.
*G06F 3/12* (2006.01)
*G06F 3/0482* (2013.01)

(52) U.S. Cl.
CPC .......... *G06F 3/1205* (2013.01); *G06F 3/0482* (2013.01); *G06F 3/1238* (2013.01)

(58) Field of Classification Search
None
See application file for complete search history.

(56) References Cited

U.S. PATENT DOCUMENTS

| | | | | |
|---|---|---|---|---|
| 8,964,204 | B2* | 2/2015 | Ogasawara | G06K 15/1856 358/1.14 |
| 9,992,363 | B2* | 6/2018 | Kodama | G06F 3/1222 |
| 2009/0310178 | A1* | 12/2009 | Tomita | G06F 21/608 358/1.15 |
| 2010/0007907 | A1* | 1/2010 | Aikens | G06F 3/1238 358/1.14 |
| 2013/0308156 | A1* | 11/2013 | Kakutani | G06K 15/4095 358/1.14 |
| 2014/0233053 | A1* | 8/2014 | Kakutani | H04N 1/444 358/1.14 |
| 2015/0055183 | A1* | 2/2015 | Kaneko | G06F 3/1211 358/1.16 |
| 2018/0275939 | A1* | 9/2018 | Kanai | G06F 3/1222 |
| 2018/0285579 | A1* | 10/2018 | Viswanathan | H04N 1/4413 |
| 2019/0012118 | A1* | 1/2019 | Nakajima | G06F 3/0482 |
| 2019/0034137 | A1* | 1/2019 | Yokoyama | G06F 3/1211 |
| 2021/0326085 | A1* | 10/2021 | Anderson | G06K 15/4095 |

FOREIGN PATENT DOCUMENTS

JP      2007257015 A      10/2007
JP      4771144 B2        9/2011

* cited by examiner

*Primary Examiner* — Dung D Tran
(74) *Attorney, Agent, or Firm* — Canon U.S.A., Inc. IP Division

(57) ABSTRACT

An image forming apparatus manages whether or not job information is displayed for each stored print job, displays notification information for notifying a user that the print job is stored if there is a print job of which the job information has not been displayed, and does not display the notification information if there is no print job of which the job information has not been displayed.

15 Claims, 20 Drawing Sheets

FIG. 9

STORED PRINT JOB LIST 1000

| USER ID | PRINT JOB NAME | PRINTED FLAG | PRINT JOB NOTIFICATION FLAG | PRINT SETTINGS | STORING DATE AND TIME | STORING LOCATION |
|---|---|---|---|---|---|---|
| Kaneko | ASSET MANAGEMENT | OFF | OFF | COPIES=1<br>DUPLEX PRINTING=OFF<br>COLOR MODE=COLOR<br>1 in 1 | 2021/10/18 10:00 | /data/kaneko/doc1 |
| Kaneko | ASSET MANAGEMENT | ON | OFF | COPIES=1<br>DUPLEX PRINTING=ON<br>COLOR MODE=MONOCHROME<br>4 in 1 | 2021/10/18 10:01 | /data/kaneko/doc2 |
| kaneko | PRESENTATION DOCUMENT | OFF | OFF | COPIES=1<br>DUPLEX PRINTING=OFF<br>COLOR MODE=MONOCHROME<br>2 in 1 | 2021/10/18 10:30 | /data/kaneko/doc3 |
| kaneko | PRESENTATION DOCUMENT | ON | OFF | COPIES=1<br>DUPLEX PRINTING=OFF<br>COLOR MODE=MONOCHROME<br>1 in 1 | 2021/10/18 10:31 | /data/kaneko/doc4 |
| Kaneko | INTERNAL PACKING SLIP | ON | OFF | COPIES=1<br>DUPLEX PRINTING=OFF<br>COLOR MODE=MONOCHROME<br>1 in 1 | 2021/10/18 10:40 | /data/kaneko/doc5 |
| kaneko | REPORT | OFF | OFF | COPIES=1<br>DUPLEX PRINTING=OFF<br>COLOR MODE=MONOCHROME<br>1 in 1 | 2021/10/18 10:50 | /data/kaneko/doc6 |
| kaneko | REPORT | OFF | OFF | COPIES=1<br>DUPLEX PRINTING=OFF<br>COLOR MODE=MONOCHROME<br>1 in 1 | 2021/10/18 11:30 | /data/kaneko/doc7 |
| kaneko | EVENT INFORMATION | OFF | ON | COPIES=1<br>DUPLEX PRINTING=OFF<br>COLOR MODE=MONOCHROME<br>2 in 1 | 2021/10/18 13:10 | /data/kaneko/doc8 |

FIG. 14

NOTIFICATION INFORMATION 1500

| NOTIFICATION TITLE | NOTIFICATION MESSAGE |
|---|---|
| AUTHENTICATION PRINT | THERE IS A NEWLY ARRIVED PRINT JOB<br>NUMBER OF PRINT JOBS: 1 |

1501, 1502, 1503

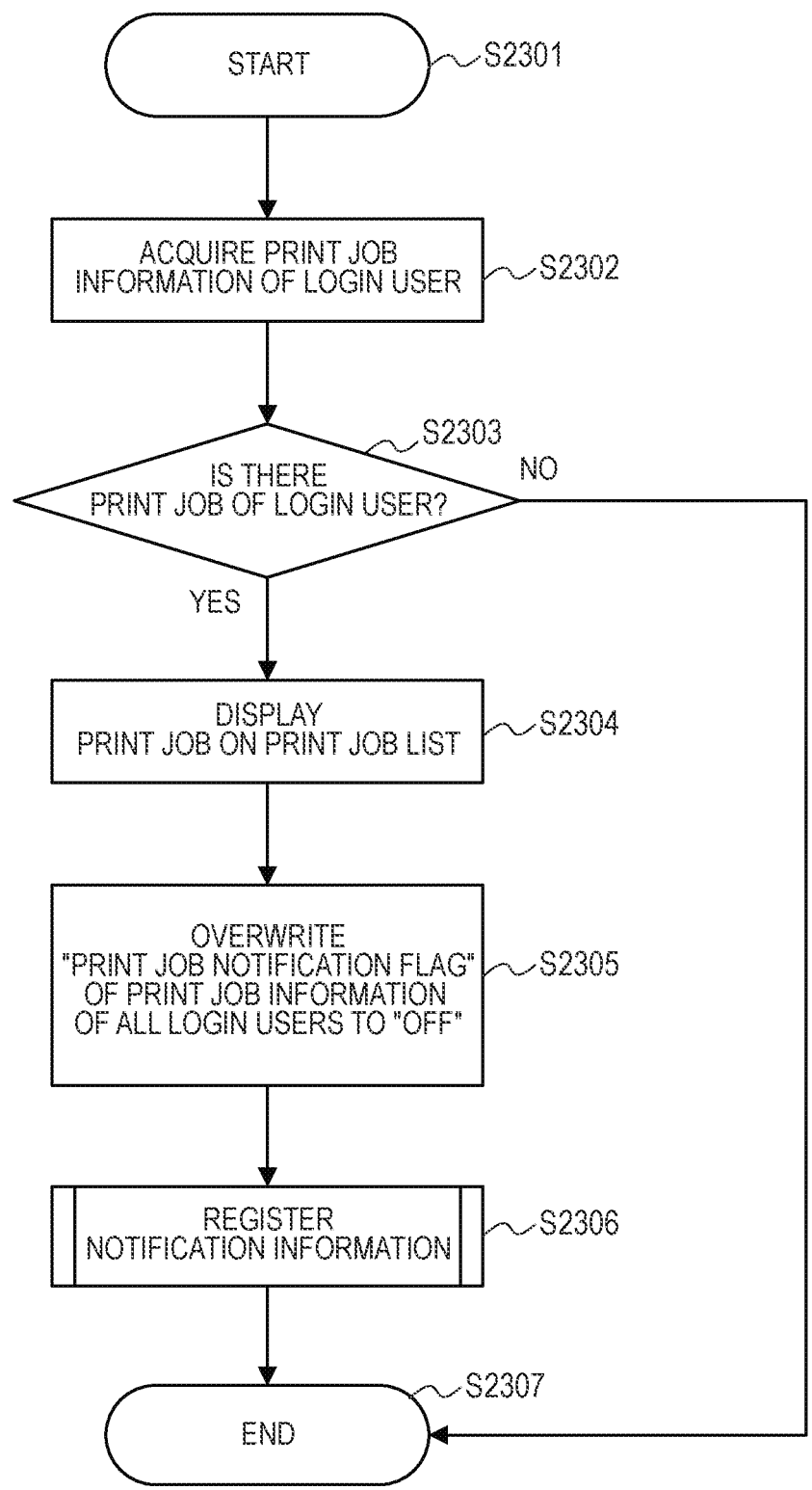

IMAGE FORMING APPARATUS, METHOD OF CONTROLLING IMAGE FORMING APPARATUS, AND STORAGE MEDIUM

BACKGROUND OF THE DISCLOSURE

Field of the Disclosure

The present disclosure relates to an image forming apparatus that notifies a user that there is a print job stored in the image forming apparatus, a method of controlling the image forming apparatus, and a storage medium.

Description of the Related Art

For the purpose of improving security, there is an authentication print system that stores a print job transmitted from a printer driver on a hard disk or the like in an image forming apparatus, authenticates a user via the operation unit of the image forming apparatus, and then prints the stored print job.

There is also a print system that notifies the user that there is a print job by displaying on the operation unit that the print job is stored in a hard disk or the like of the image forming apparatus. Japanese Patent No. 4771144 discloses a technique that notifies a user that there is an unprinted job in response to detecting the unprinted job when the user uses the image forming apparatus.

According to the technique of Japanese Patent No. 4771144, the user can recognize that there is the unprinted job, but cannot recognize whether the unprinted job is a newly arrived job or not. Therefore, in order for users to recognize that there is a newly arrived job, the user has to look at a displayed list of the print jobs to visually confirm whether there is a newly arrived job or not, which is time-consuming. Further, because the technique of Japanese Patent No. 4771144 notifies that there is the unprinted job, the notification is continuously displayed in the operation unit even for the print job once confirmed by a user. Regarding the print job confirmed by the user, since the user has recognized that there is the print job, continuing to display the notification of the print job that has been confirmed once in the operation unit has been annoying for the user.

SUMMARY OF THE DISCLOSURE

The present disclosure provides a scheme that effectively notifies the user that there is an unconfirmed print job to reduce the annoyance caused by excessive notification and improve usability.

According to embodiments of the present disclosure, an image forming apparatus comprises: a display unit; one or more memories; and one or more processors that execute instructions to: store a plurality of print jobs in the one or more memories; notify a user that the plurality of print jobs is stored by displaying notification information on the display unit; display job information about the plurality of print jobs stored in the one or more memories on the display unit; and manage whether or not the job information is displayed for each of the plurality of print jobs, wherein the notification information is displayed if a print job of which the job information has not been displayed is stored in the one or more memories, and wherein the notification information is not displayed if a print job of which the job information has not been displayed is not stored in the one or more memories.

Further features of the present disclosure will become apparent from the following description of exemplary embodiments with reference to the attached drawings.

BRIEF DESCRIPTION OF THE DRAWINGS

FIG. 9 illustrates an example showing a stored job list.

FIG. 14 illustrates an example showing the notification information of the print job.

FIG. 20 illustrates a flowchart showing another example of display processing of the print job list on the authentication print screen.

DESCRIPTION OF THE EMBODIMENTS

Hereafter, configurations for carrying out embodiments of the present disclosure are described using drawings.

The present embodiment will describe how to control notifications if notifying a user that there is a print job stored in an image forming apparatus. In particular, a notification control method will be described, the method notifying the user that there is a newly arrived print job if the user has not confirmed the print job since the print job was stored in the image forming apparatus, and not notifying the user that there is the newly arrived print job if the user has confirmed the print job after the print job was stored in the image forming apparatus. It should be noted that insignificant portions of the present disclosure are left in summary descriptions and detailed descriptions are omitted.

Figure 1:
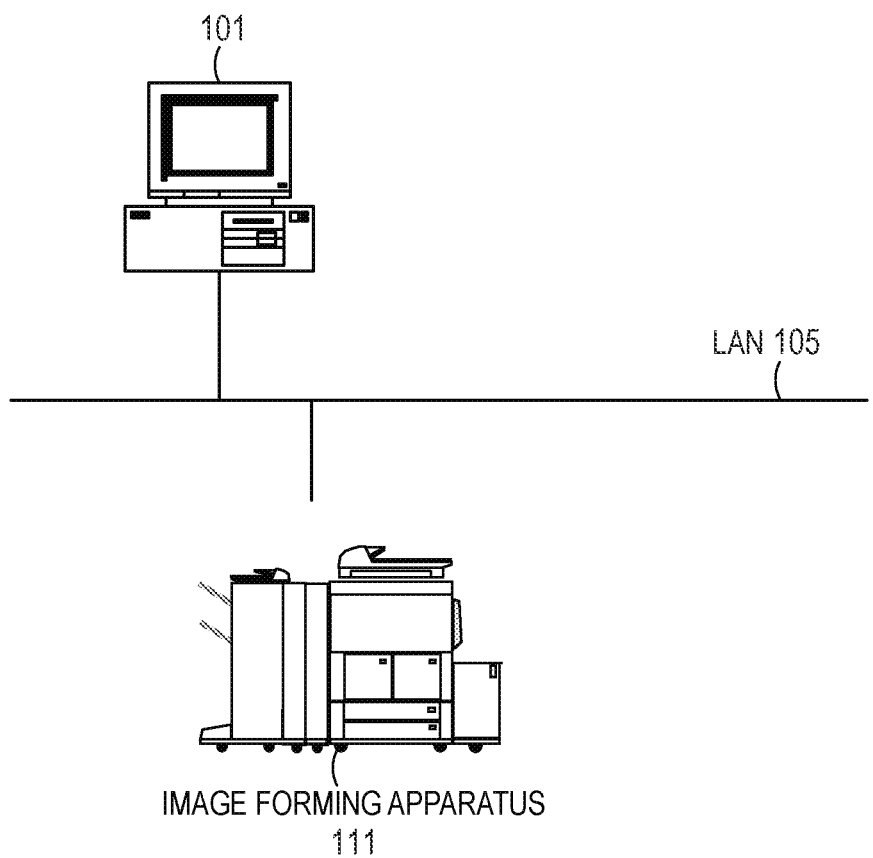
FIG. 1 illustrates an example showing a configuration of a print system in the present embodiment.

FIG. 1 illustrates a diagram showing an example of the configuration of the print system in the present embodiment of the present disclosure. In FIG. 1, an information processing apparatus 101 may be connected to a network (LAN 105). An image forming apparatus 111 may communicate with the information processing apparatus 101 via the LAN 105. The image forming apparatus 111 is capable of printing print jobs received from the information processing apparatus 101.

The LAN 105 may be wired or wireless. The information processing apparatus 101 and the image forming apparatus 111 may be communicably connected and may be communicably connected via USB, NFC, Bluetooth®, and the like.

Figure 2:
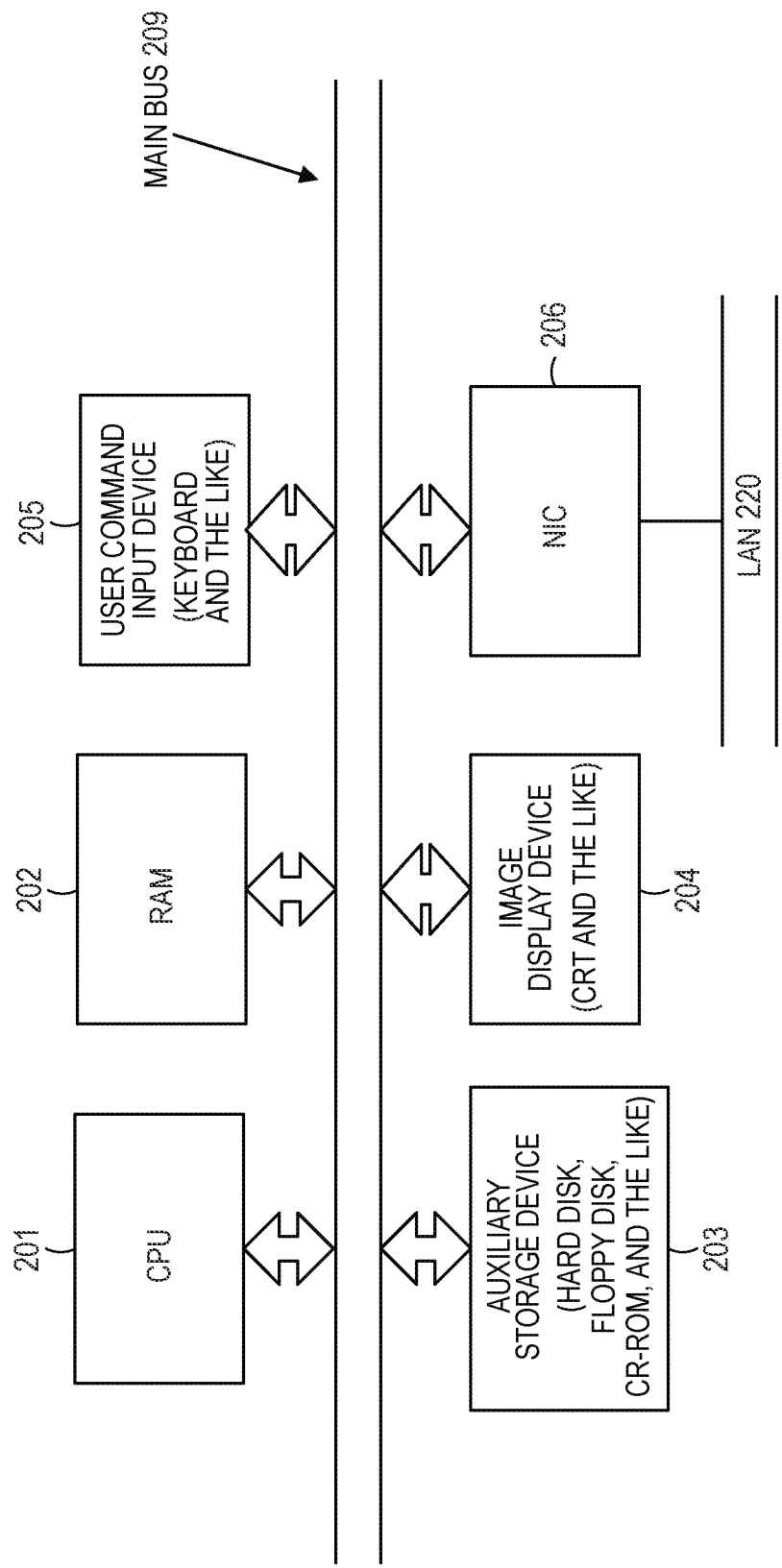
FIG. 2 illustrates an example showing an internal configuration of the information processing apparatus.

FIG. 2 illustrates an example showing an internal configuration of a general information processing apparatus and showing an internal configuration of the information processing apparatus 101 shown in FIG. 1. A CPU 201 performs information processing that controls the information processing apparatus 101. A RAM 202 provides a work area for the CPU 201. An auxiliary storage device 203 stores various control programs, and may be an HDD (Hard Disk Drive), an SSD (Solid State Drive), and the like. The CPU 201 performs various types of control by loading programs stored in the auxiliary storage device 203 into the RAM and executing the programs as needed.

An image display device 204 is used to notify a user of a message, and may be a CRT display, a liquid crystal display, and the like. A user command input device 205 is used for inputting user commands, and may be a mouse, a touch panel, a keyboard, and the like. A network interface card (NIC) 206 exchanges data with other network devices via a LAN 220 (corresponding to the LAN 105 shown in FIG. 1). The CPU 201, the RAM 202, the auxiliary storage device 203, the image display device 204, the user command input device 205, and the NIC 206 are connected to a main bus 209.

Figure 3:
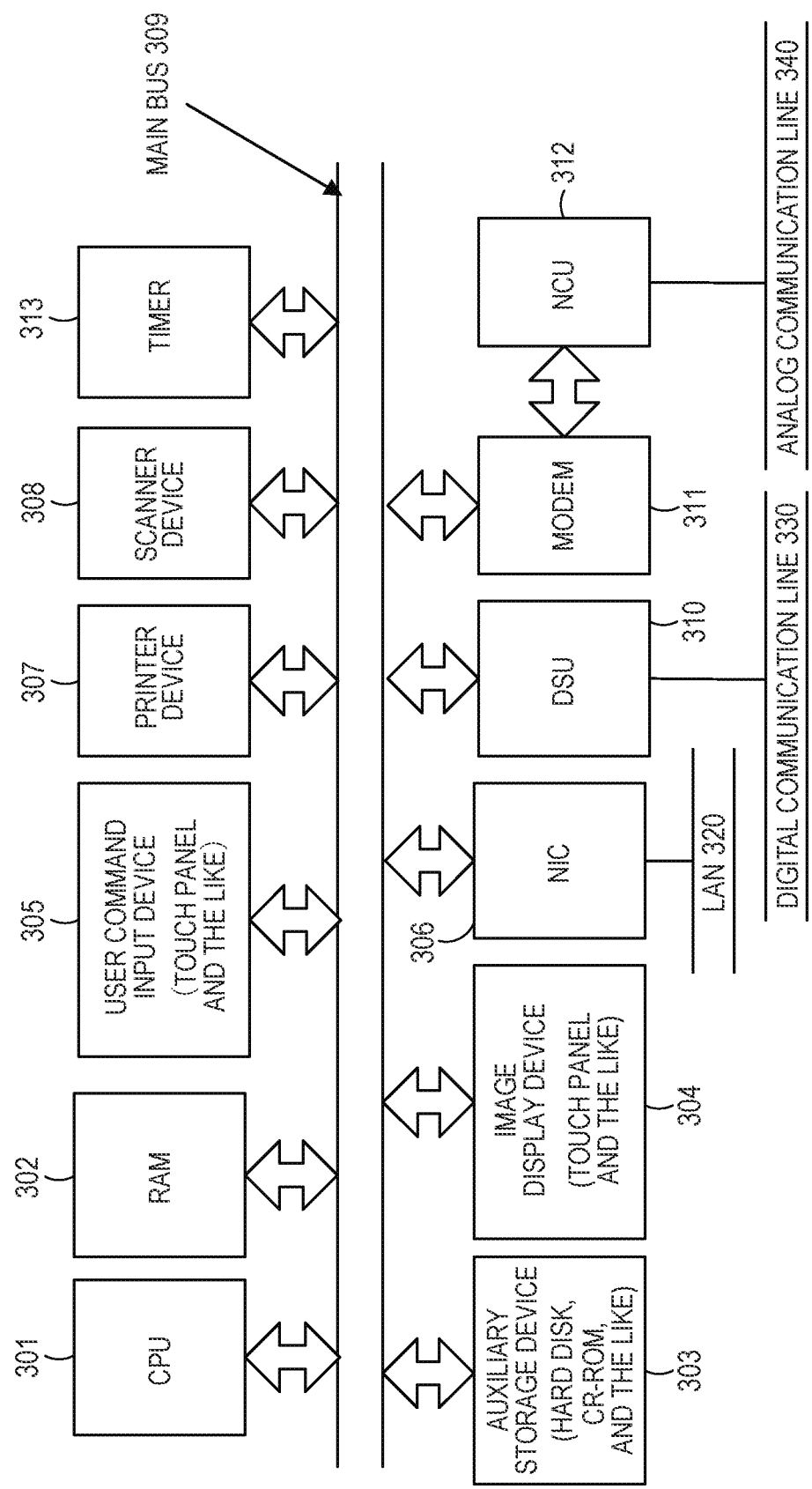
FIG. 3 illustrates an example showing an internal configuration of the image forming apparatus.

FIG. 3 illustrates an example showing an internal configuration of the image forming apparatus 111. A CPU 301 performs information processing that controls the image forming apparatus 111. A RAM 302 provides a work area for the CPU 301 and temporarily stores data. An auxiliary storage device 303 stores various control programs and data, and may be an HDD, an SSD, and the like. The auxiliary storage device 303 may be used for the temporary storage of data instead of the RAM 302.

An image display device 304 may be a liquid crystal display with a touch panel and the like, and is used to display status of the image forming apparatus 111, error messages, and the like. A user command input device (touch panel and the like) 305 is used for specifying desired print jobs and the like via the user operation. An MC 306 is used to exchange data bidirectionally with other network devices via a LAN 320 (corresponding to the LAN 105 shown in FIG. 1).

A printer device 307 is used for printing scanned image data and image data received from other network devices via the NIC 306 on sheets. A scanner device 308 scans paper documents placed on a platen to generate monochrome (binary) image data, multi-colored image data, and the like. The image data scanned by the scanner device 308 may be printed by the printer device 307 and the image data may be stored in the auxiliary storage device 303 and printed at any time.

A DSU (Digital Service Unit) 310 is connected to a digital communication line 330 and used for data transmission and reception. An NCU (Network Control Unit) 312 is connected to an analog communication line 340 for opening and closing the line, controlling incoming and outgoing calls, and transmitting and receiving image data (analog image data). A modem 311 modulates and demodulates transmitted and received data. A timer 313 performs time management.

Figure 4A:
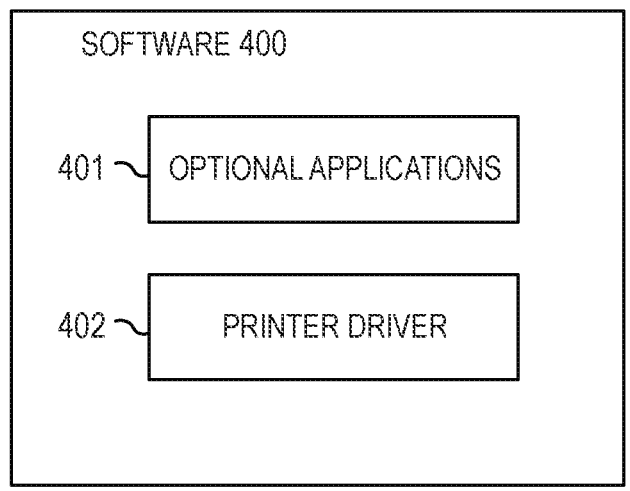
FIG. 4A illustrates an example showing a configuration of the software of the information processing apparatus.

FIG. 4A illustrates an example showing the software configuration of the information processing apparatus 101. Software 400 is a software module that is realized and operated by the CPU 201 reading and executing a program stored in the auxiliary storage device 203 or the like into the RAM 202 as required.

The software 400 includes an optional application 401 and a printer driver 402. The optional application 401 is a tool such as creating and editing an image or document by using the user command input device 205 such as a pointing device or a keyboard while viewing the image display device 204 of the information processing apparatus 101. The printer driver 402 is software for converting images and documents created by the optional application 401 into a format that can be interpreted by the image forming apparatus 111.

Figure 4B:
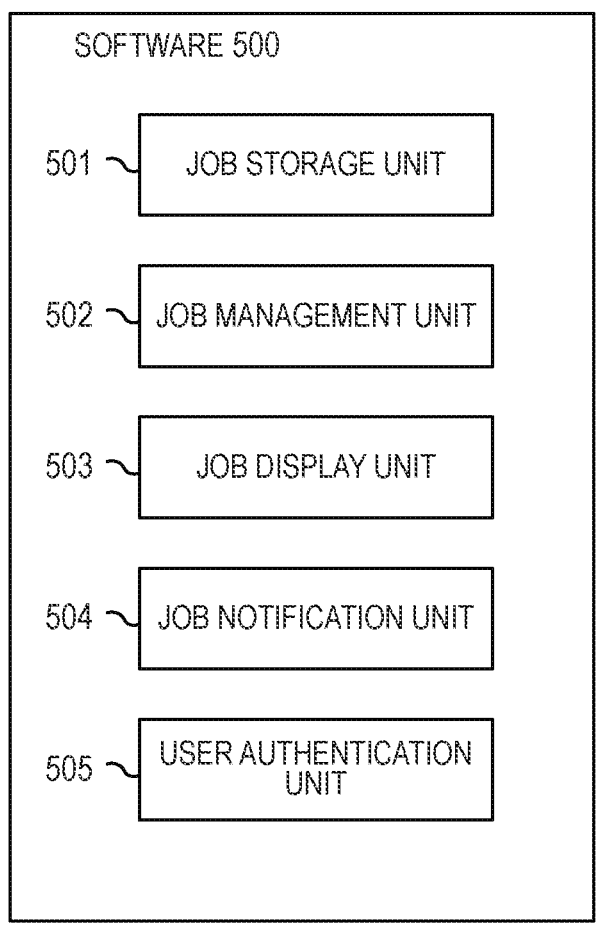
FIG. 4B illustrates an example showing a configuration of the software of the image forming apparatus.

FIG. 4B illustrates an example showing the software configuration of the image forming apparatus 111. Software 500 is a software module that is realized and operated by the CPU 301 reading and executing a program stored in the auxiliary storage device 303 into the RAM 302.

The software 500 includes a job storage unit 501, a job management unit 502, a job display unit 503, a job notification unit 504, and a user authentication unit 505. The job storage unit 501 receives a print job 700 received by the NIC 306 from the information processing apparatus 101 and stores the print job 700 in the auxiliary storage device 303 as a print job 700 including a format shown in FIG. 6.

The job management unit 502 analyzes the print job 700 input from the information processing apparatus 101, stores and manage it in the auxiliary storage device 303. The job management unit 502 is used to print the print jobs stored in the auxiliary storage device 303 using the printer device 307. The job display unit 503 displays the print jobs stored in the auxiliary storage device 303 by the image forming apparatus 111 on the image display device 304.

The job notification unit 504 analyzes the print jobs stored in the auxiliary storage device 303, determines whether or not there is information to be notified to the user, and controls the display of the determined information to be notified in the image display device 304. The user authentication unit 505 identifies the user who uses the image forming apparatus 111.

Figure 5:
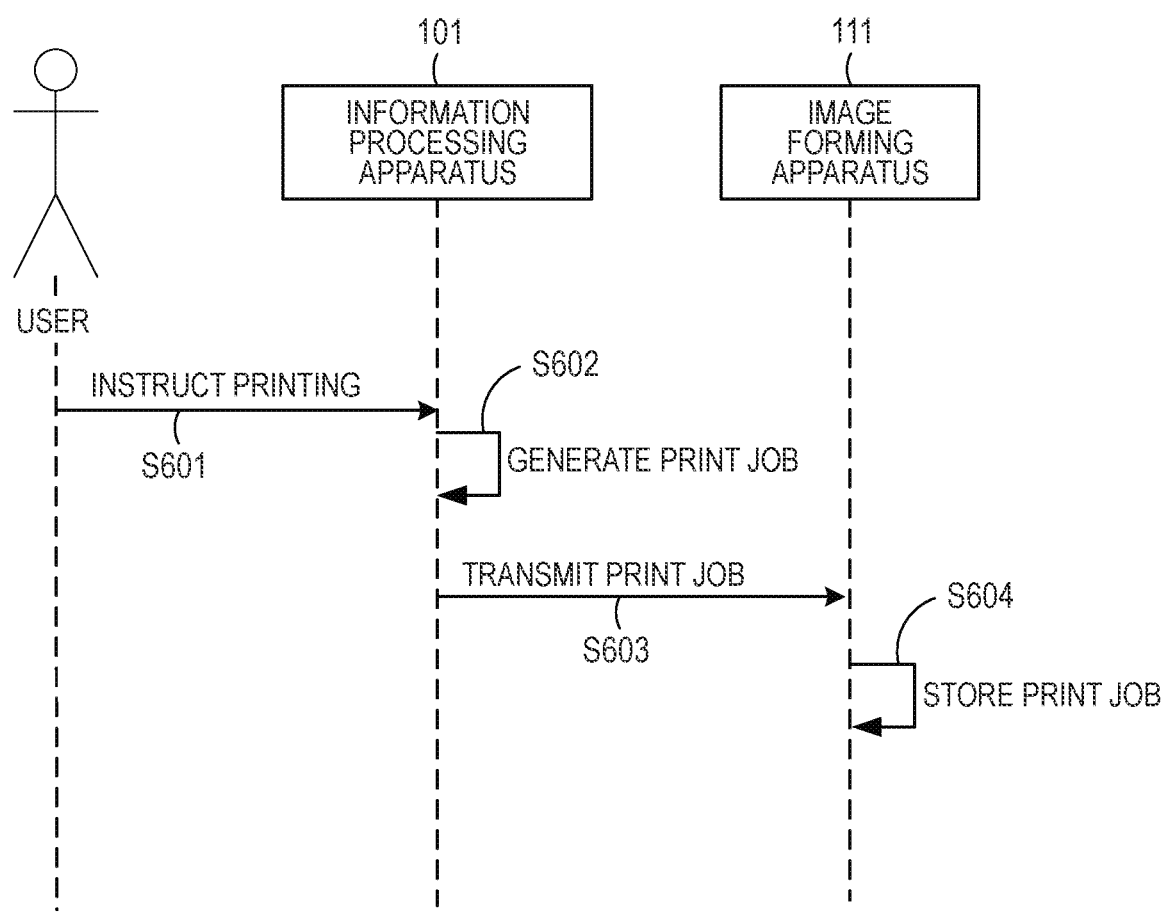
FIG. 5 illustrates a sequence diagram for transmitting the print job from the information processing apparatus to the image forming apparatus.

FIG. 5 illustrates a sequence diagram showing the outline of the processing of the information processing apparatus 101 and the image forming apparatus 111 if the user transmits a print job from the information processing apparatus 101 to the image forming apparatus 111. The information processing apparatus 101 operates based on the software 400. Also, the image forming apparatus 111 operates based on the software 500.

The user instructs the information processing apparatus 101 to perform printing via the optional application 401 (step S601). In response to the user instruction in step S601, the information processing apparatus 101 generates the print job 700 using the printer driver 402 from the data created by the optional application 401 (step S602). Next, the information processing apparatus 101 transmits the print job 700 to the image forming apparatus 111 via the NIC 206 (step S603). Upon receiving the print job 700, the image forming apparatus 111 stores the received print job 700 in the auxiliary storage device 303 (step S604).

Figure 6:
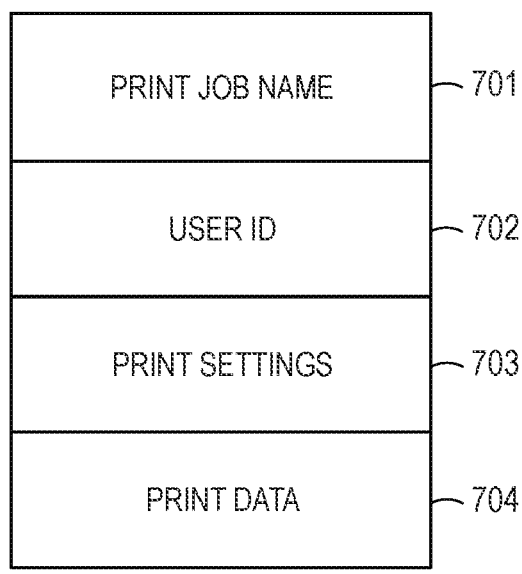
FIG. 6 illustrates an example showing a data structure of the print job.

FIG. 6 illustrates an example showing the print job generated by the information processing apparatus 101. The print job 700 includes a print job name 701, a user ID 702, print settings 703, and print data 704. The print job name 701 represents a name of the print job. The user ID 702 identifies the user who generated the print job. The print settings 703 indicate print information such as single-sided/double-sided, number of copies to be printed, color mode, and the like. The print data 704 includes bitmaps, rectangular data, and the like, for generating image data when printing. The job management unit 502 of the image forming apparatus 111 interprets the print job 700 and can print the print data 704 using the printer device 307 by applying the print settings 703.

Figure 7:
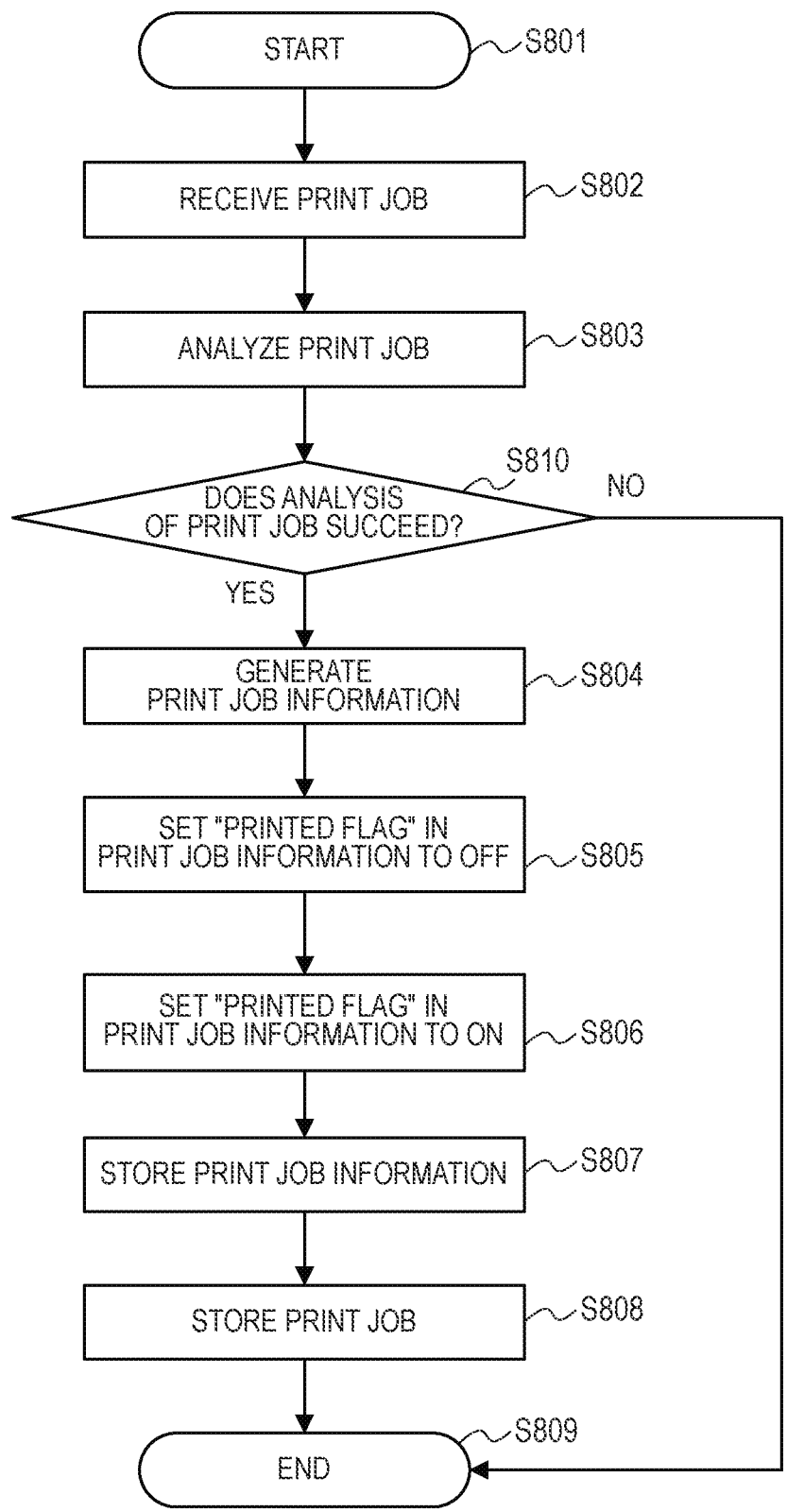
FIG. 7 illustrates a flowchart showing job reception processing.

FIG. 7 illustrates a flowchart showing an example of the details of the process (step S604 in FIG. 5) in which the image forming apparatus 111 stores the print job 700 in the auxiliary storage device 303. The processing of the flowchart is realized by the CPU 301 reading and executing a program corresponding to the software 500 stored in the auxiliary storage device 303 or the like into the RAM 302.

If the job management unit 502 receives the print job 700 (step S802), the process proceeds to step S803. In step S803, the job management unit 502 analyzes the print job name 701, the user ID 702, the print settings 703, and the print data 704 using the print job 700.

In step S810, the job management unit 502 determines whether or not the analysis of the print job 700 in step S803 has been successful. If the analysis of the print job 700 in step S803 fails (No in step S810), the job management unit 502 cancels the job storage processing and terminates the processing of the flowchart (step S809). It should be noted that the analysis of the print job 700 fails in step S803, for example, if the data of the received print job 700 is corrupted or the print data 704 included in the print job 700 is formed in an unsupported data format.

On the other hand, if the analysis of the print job 700 in step S803 is successful (Yes in step S810), the job management unit 502 advances the process to step S804. In step S804, the job management unit 502 generates print job information 900 as shown in FIG. 8 from the analysis result in step S803.

The job management unit 502 sets a printed flag 903 of the print job information 900 to OFF (step S805), sets a print job notification flag 904 to ON (step S806), and adds the print job information 900 to a stored print job list 1000 as shown in FIG. 9 (step S807). Then, in step S808, the job management unit 502 stores the print job 700 in the auxiliary storage device 303 and terminates the processing of the flowchart (step S809).

Figure 8:
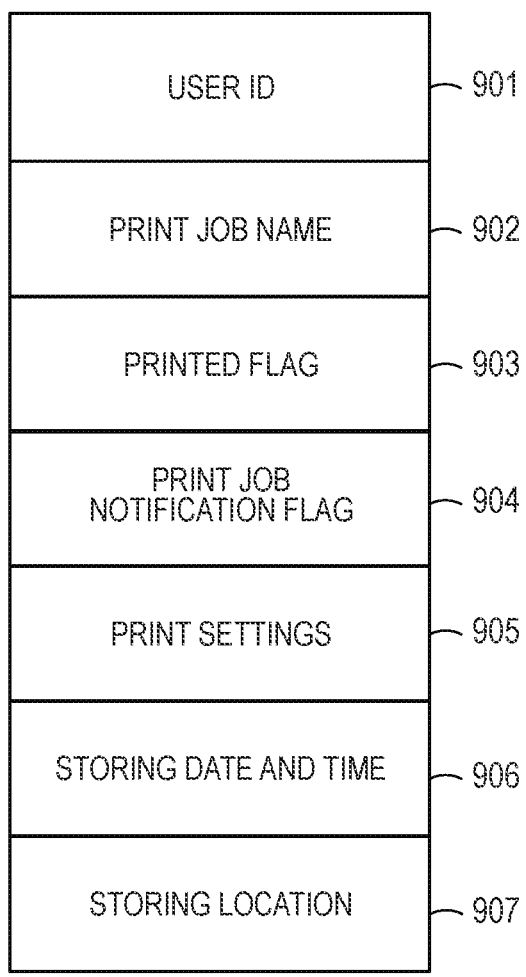
FIG. 8 illustrates an example showing print job information.

FIG. 8 illustrates an example showing the print job information 900. The print job information 900 includes a user ID 901, a print job name 902, a printed flag 903, a print job notification flag 904, print settings 905, storing date and time 906, and a storing location 907. The user ID 901 corresponds to the user ID 702 included in the print job 700. The print job name 902 corresponds to the print job name 701 included in the print job 700. The print settings 905 corresponds to the print settings 703 included in the print job 700.

The printed flag 903 is information indicating whether or not the print job 700 has been printed. In the present embodiment, the printed flag 903 is represented as ON if the print job 700 has been printed, and represented as OFF if the print job 700 has not been printed. At the time when the print job 700 is received in FIG. 7, the printed flag 903 is OFF. That is, the printed job can be identified by the printed flag 903.

The print job notification flag 904 is a flag for determining whether or not to notify the user that there is a print job. In the present embodiment, the print job notification flag 904 is represented as ON if notifying the user, and represented as OFF if not notifying the user. At the time when the print job 700 is received in FIG. 7, the print job notification flag 904 is ON. That is, the print job (in the present embodiment, a user-unconfirmed print job) to be notified to the user can be identified by the print job notification flag 904.

The storing date and time 906 is information of date and time indicating when the job storage unit 501 stored the print job 700 in the auxiliary storage device 303. The storing location 907 indicates a location storing the print job 700 in the auxiliary storage device 303.

FIG. 9 illustrates a diagram showing an example of the stored print job list. For example, a stored print job list 1000 is stored in the auxiliary storage device 303. The stored print job list 1000 is data for managing a list of the print job information 900 generated when the job storage unit 501 stores the print jobs in the auxiliary storage device 303.

The stored print job list 1000 includes a user ID 1001, a print job name 1002, a printed flag 1003, a print job notification flag 1004, print settings 1005, storing date and time 1006, and a storing location 1007. The user ID 1001 corresponds to the user ID 901 in the print job information 900. The print job name 1002 corresponds to the print job name 902 in the print job information 900. The printed flag 1003 corresponds to the printed flag 903 in the print job information 900. The print job notification flag 1004 corresponds to the print job notification flag 904 in the print job information 900. The print settings 1005 correspond to the print settings 905 in the print job information 900. The storing date and time 1006 corresponds to the storing date and time 906 in the print job information 900. The storing location 1007 corresponds to the storing location 907 in the print job information 900. The stored print job list 1000 manages the stored print jobs of all users in the present embodiment, but the stored print job list 1000 may separately manage each user ID.

Figure 10:
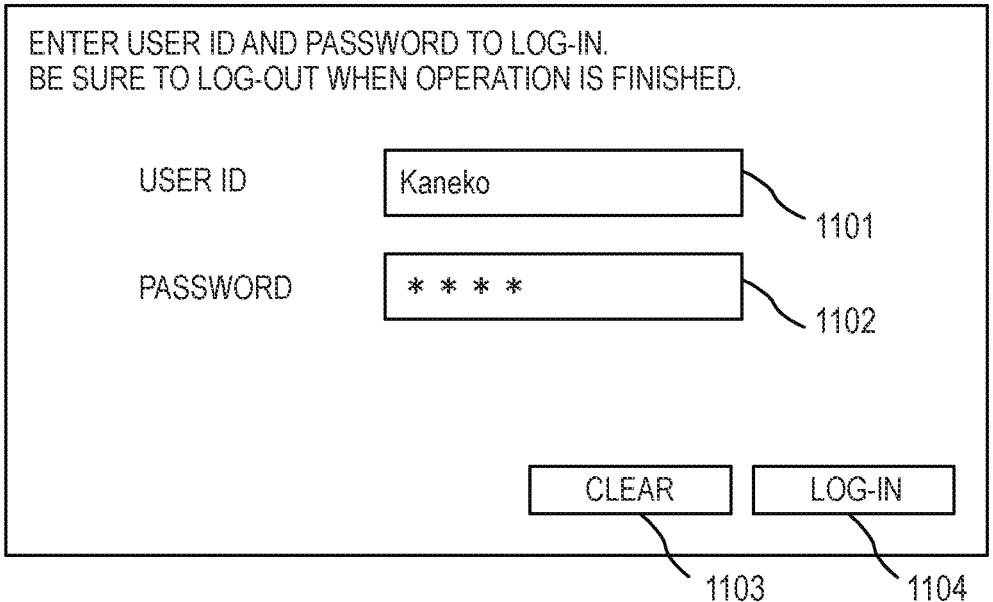
FIG. 10 illustrates an example showing a user authentication screen in the image forming apparatus.

FIG. 10 illustrates an example showing a user authentication screen displayed by the software 500 of the image forming apparatus 111. The user authentication screen is displayed on the image display device 304. In the user authentication screen 1100, the user enters an ID 1101 and a password 1102, and presses a login button 1104 to request user authentication to the user authentication unit 505. The user authentication unit 505 performs user authentication based on the information entered on the user authentication screen 1100 and performs processing according to a result of the user authentication. Detailed descriptions of the user authentication process are omitted.

Figure 11:
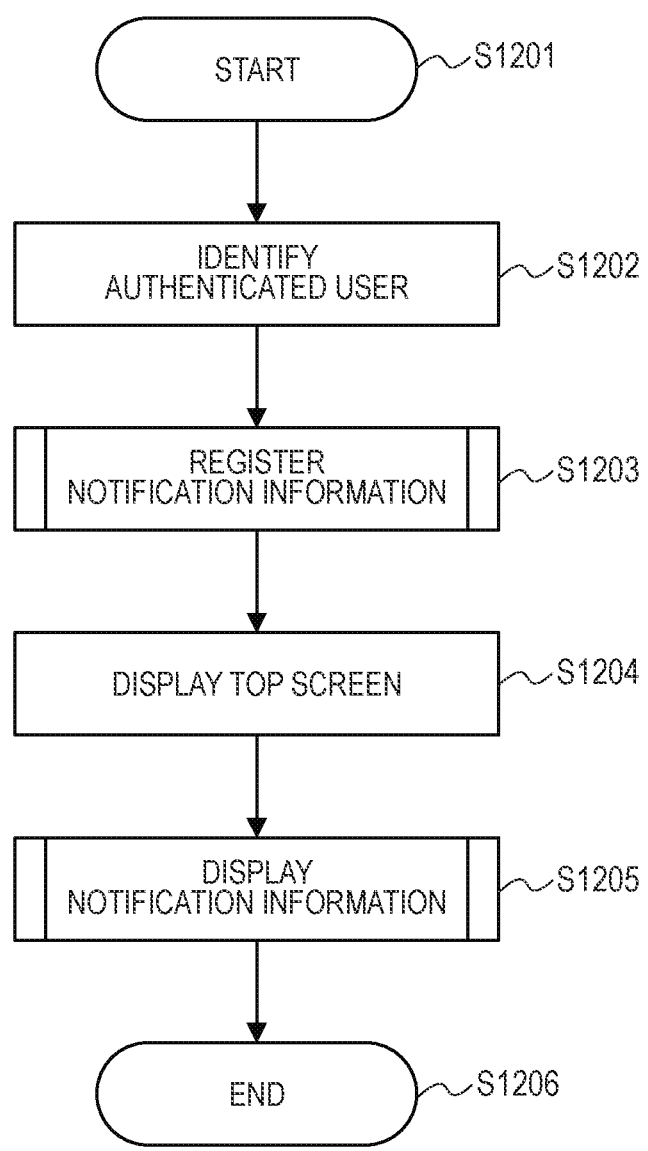
FIG. 11 illustrates a flowchart showing screen display processing after the user authentication.

FIG. 11 illustrates a flowchart showing the processing of the image forming apparatus 111 based on the software 500 if the user authentication using the user authentication screen 1100 is successful. The processing of the flowchart is realized by the CPU 301 reading and executing a program corresponding to the software 500 stored in the auxiliary storage device 303 or the like into the RAM 302.

Upon successful user authentication, the image forming apparatus 111 starts processing the flowchart (step S1201). In step S1202, the image forming apparatus 111 acquires authenticated user information from the user authentication unit 505 and identifies the authenticated user.

Figure 12:
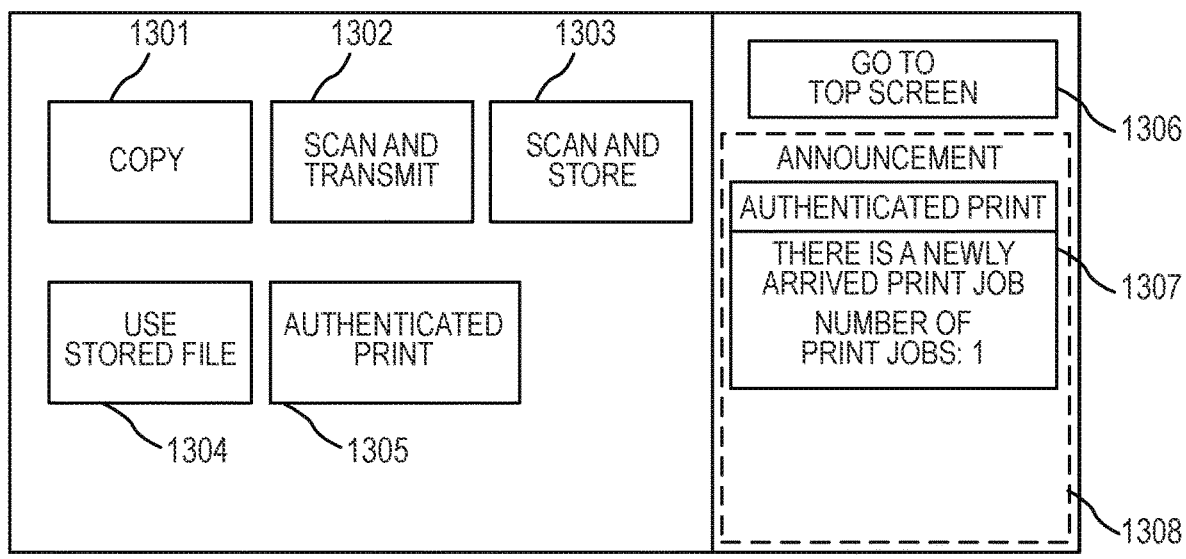
FIG. 12 illustrates an example showing a top screen of the image forming apparatus.

In step S1203, the job notification unit 504 performs registration processing of notification information shown in FIG. 13, which will be described later. Further, in step S1204, the job notification unit 504 displays a top screen 1300 as shown in FIG. 12. In step S1206, the job notification unit 504 performs display processing of the notification information shown in FIG. 15A, which will be described later, and terminates processing of the flowchart (step S1206).

FIG. 12 illustrates a diagram showing an example of the top screen 1300 displayed on the image display device 304 of the image forming apparatus 111 for operating the image forming apparatus 111 if the user authentication is successful via the user authentication screen 1100.

Function buttons 1301 to 1305 are buttons for using functions provided by the image forming apparatus 111. A button 1306 is a button for instructing a screen transition when the user wants to display the top screen while any screen is displayed.

A notification information display area 1308 is an area for displaying information to be notified to the user and is used for notifying that there is a print job or displaying a history of executed print jobs in a timeline. Notification 1307 shows an example of notification when there is a newly arrived job in the authentication print function.

Figure 13:
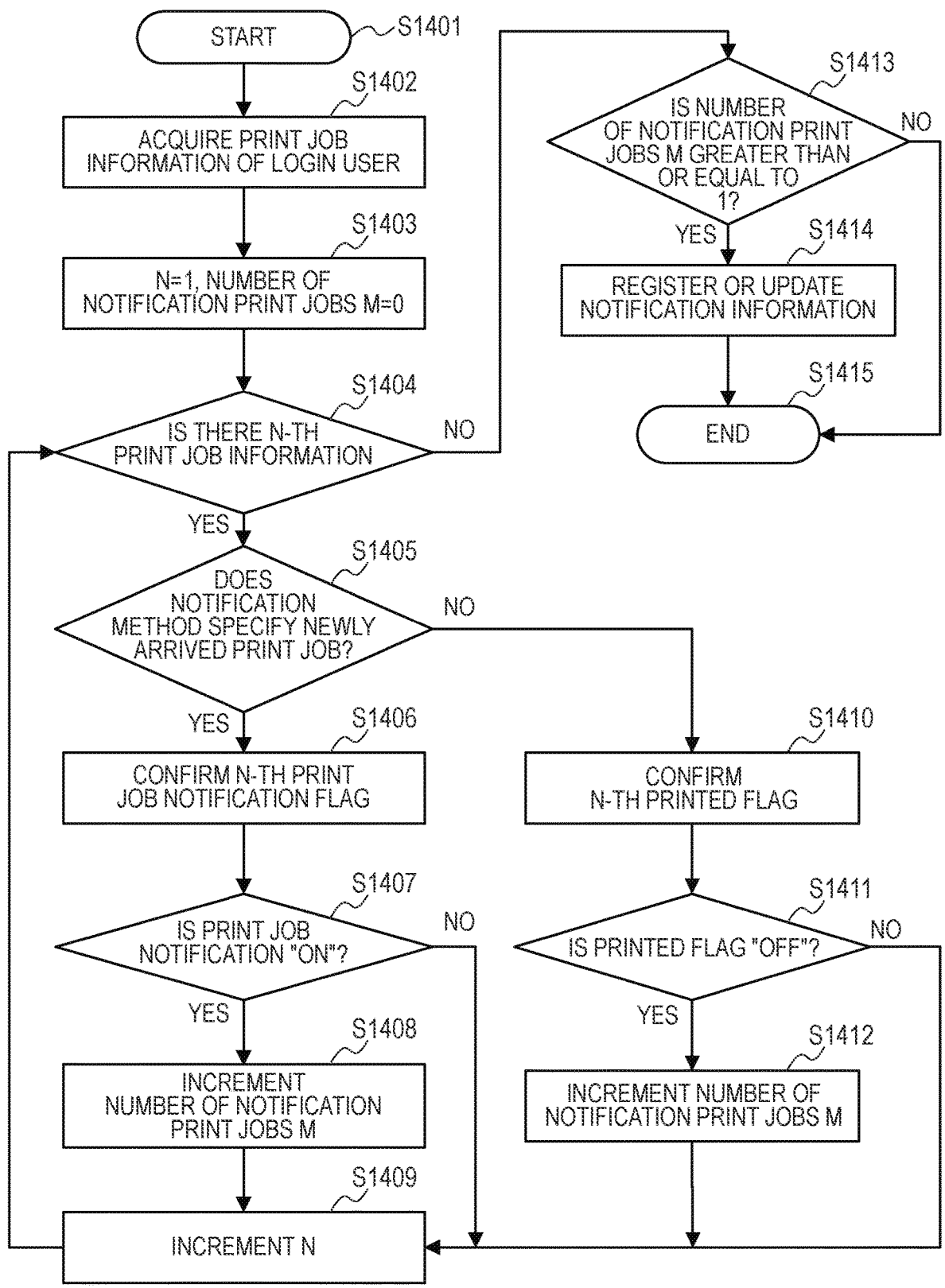
FIG. 13 illustrates a flowchart showing registration and updating process of notification information.

FIG. 13 illustrates a flowchart showing a registration processing of notification information 1500 to be notified to the notification information display area 1308 by the job notification unit 504 (for example, step S1203 in FIG. 11). The processing of the flowchart is realized by the CPU 301 reading and executing a program corresponding to the software 500 stored in the auxiliary storage device 303 or the like into the RAM 302.

In the flowchart, the registration process of the notification information 1500 starts in step S1401. Note that the notification information 1500 is information to be displayed in the notification information display area 1308 shown in FIG. 12, and the details will be described later in FIG. 14. In step S1402, the job notification unit 504 refers to the stored print job list 1000 and acquires the print job information of the login user.

In step S1403, the job notification unit 504 initializes a variable N for the repetition processing with 1 and initializes the number of notification print jobs M with 0. In step S1404, the job notification unit 504 determines whether or not there is an N-th print job information of the login user acquired in step S1402. If there is the N-th print job information of the login user (Yes in step S1404), the job notification unit 504 advances the process to step S1405.

Figure 15A:
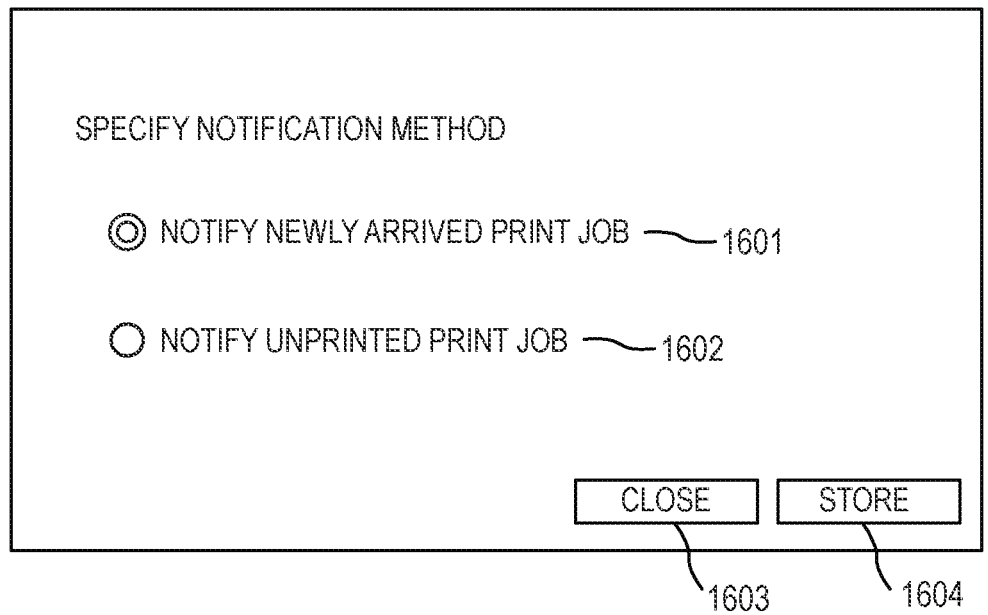
FIG. 15A illustrates an example showing a screen for specifying the notification information of the print job.

In step S1405, the job notification unit 504 determines whether or not a notification method 1700 is specified as "notification of newly arrived print job". Note that the notification method 1700 can be specified from a screen as shown in FIG. 15A and details will be described with reference to FIG. 15A and FIG. 15B. If the notification method 1700 is specified as "notification of newly arrived print job" (Yes in step S1405), the job notification unit 504 advances the process to step S1406. In step S1406, the job notification unit 504 confirms the print job notification flag 1004 of the N-th print job.

In step S1407, the job notification unit 504 determines whether or not the print job notification flag 1004 of the N-th print job confirmed in step S1406 indicates "ON". If the print job notification flag 1004 of the N-th print job indicates "OFF" (No in step S1407), the job notification unit 504 increments the variable N in the repetition processing table (step S1409) and the process returns to step S1404.

On the other hand, if the print job notification flag 1004 of the N-th print job indicates "ON" (Yes in step S1407), the job notification unit 504 advances the process to step S1408. In step S1408, the job notification unit 504 increments the number of notification print jobs M. Further, in step S1409, the job notification unit 504 increments the variable N in the repetition processing table and the process returns to step S1404.

If the notification method 1700 specifies "notification of unprinted print job" (No in step S1405), the job notification unit 504 advances the process to step S1410. In step S1410, the job notification unit 504 confirms the printed flag 1003 of the N-th print job.

Then, in step S1411, the job notification unit 504 determines whether or not the printed flag 1003 of the N-th print job confirmed in step S1410 indicates "OFF". If the printed flag 1003 of the N-th print job indicates "ON" (No in step S1411), the job notification unit 504 increments the variable N of the repetition processing table (step S1409) and the process returns to step S1404.

On the other hand, if the printed flag 1003 of the N-th print job indicates "OFF" (Yes in step S1411), the job notification unit 504 advances the process to step S1412. In step S1412, the job notification unit 504 increments the number of notification print jobs M. Further, in step S1409, the job notification unit 504 increments the variable N of the repetition processing table and the process returns to step S1404.

If there is no N-th print job information (No in step S1404), the job notification unit 504 advances the process to step S1413. In step S1413, the job notification unit 504 determines whether or not the number of notification print jobs M is 1 or more. If the number of notification print jobs M is 0 (No in step S1413), the job notification unit 504 terminates the processing of the flowchart (step S1415).

On the other hand, if the number of notification print jobs M is 1 or more (Yes in step S1413), the job notification unit 504 advances the process to step S1414. In step S1414, the job notification unit 504 generates the notification information 1500, registers the notification information 1500 in the system as notification information or updates the system, and terminates the processing of the flowchart (step S1415).

FIG. 14 illustrates an example showing the notification information registered and updated by the job notification unit 504 in step S1414 of FIG. 13. A notification title 1501 of the notification information 1500 indicates a function name provided by the image forming apparatus 111 in the present embodiment. A notification message 1502 indicates information to notify the user. In the example shown in FIG. 14, the notification title 1501 is "authentication print" and the notification message 1502 includes "there is a newly arrived print job" and "number of print jobs: 1". The notification information 1500 is displayed by the job notification unit 504 in the notification information display area 1308 and may include two or more pieces of information.

FIG. 15A illustrates an example showing a notification method specification screen for specifying the notification method to be notified to the user by the job notification unit 504. A notification method specification screen 1600 includes a radio button 1601, a radio button 1602, a close button 1603, and an OK button 1604. The radio button 1601 controls to specify "notify newly arrived print job". The radio button 1602 controls to specify "notify unprinted print job". Only one of the radio buttons 1601 and 1602 can be selected.

If the user selects the radio button 1601 to specify "notify newly arrived print job", the print job for which the print job information has not been displayed is set as a target of notification by the job notification unit 504. If the user selects the radio button 1602 to specify "notify unprinted print job", the print job of which the print job information has not been printed is set as a target of notification by the job notification unit 504.

Figure 15B:
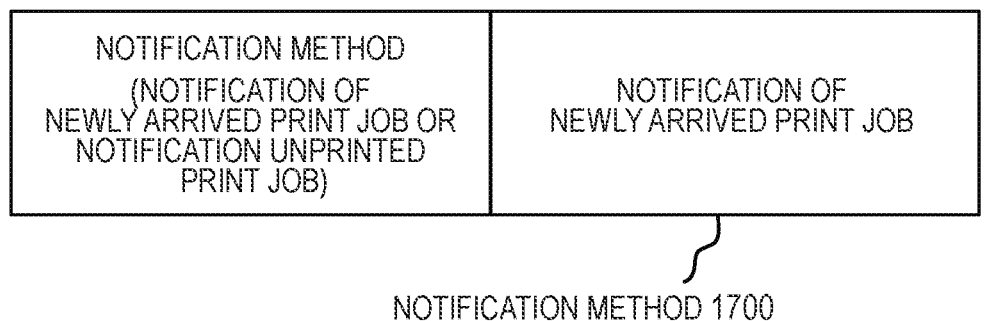
FIG. 15B illustrates an example showing a screen for specifying management information of the print job.

The close button 1603 controls to close the screen without reflecting content specified in the notification method specification screen 1600. The OK button 1604 controls to store content specified on the notification method specification screen 1600 as the notification method 1700 as shown in FIG. 15B in the auxiliary storage device 303 or the RAM 302 of the image forming apparatus 111. The notification method 1700 can be referred to by the software 500 at any time.

FIG. 15B illustrates an example showing information for storing the notification method specified via the notification method specification screen 1600. The notification method 1700 stores and manages "notify newly arrived print job" or "notify unprinted print job" as a notification method. The notification method 1700 can be specified via the notification method specification screen 1600, and it is assumed that one of the values indicating the method of "notify newly arrived print job" or "notify unprinted print job" is specified as a default setting.

In the present embodiment, if the notification method 1700 is "notify newly arrived print job" and there is a print job that has not been confirmed by the user since the print job 700 was saved, the job notification unit 504 notifies the user that there is a print job. That is, the job notification unit 504 notifies the user of only the existence of print jobs that have not been confirmed by the user. If the notification method 1700 is specified as "notify unprinted print job" and there is a print job that has not been printed since the print job 700 was saved, the job notification unit 504 notifies the user that there is a print job. That is, the job notification unit 504 notifies the user of only the existence of print jobs that have not been printed by the user.

Figure 16:
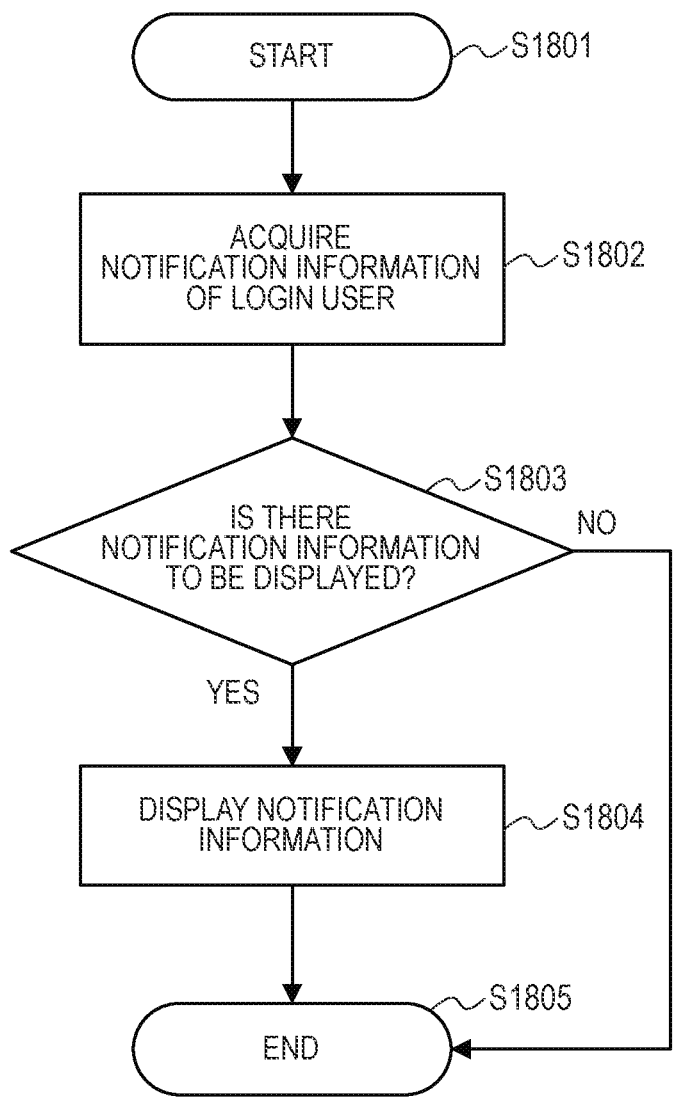
FIG. 16 illustrates a flowchart showing the processing of displaying notification information after successful user authentication.

FIG. 16 illustrates a flowchart showing details of the display processing of notification information after the successful user authentication shown in FIG. 11 (step S1205 in FIG. 11). The processing of the flowchart is realized by the CPU 301 reading and executing a program corresponding to the software 500 stored in the auxiliary storage device 303 or the like into the RAM 302.

If the job notification unit 504 is instructed to display the notification information, the processing of the flowchart starts (step S1801). In step S1802, the job notification unit 504 acquires the notification information 1500 of the login user. Note that the notification information 1500 is registered by the registration process of the notification information in FIG. 13.

In step S1803, the job notification unit 504 determines whether or not there is the notification information 1500. If there is no notification information 1500 (No in step S1803), the job notification unit 504 terminates the processing of the flowchart (step S1805).

On the other hand, if there is the notification information 1500 (Yes in step S1803), the job notification unit 504 advances the process to step S1804. In step S1804, the job notification unit 504 displays the notification information 1500 in the notification information display area 1308 as shown in FIG. 12, and terminates the processing of the flowchart (step S1805).

Figure 17:
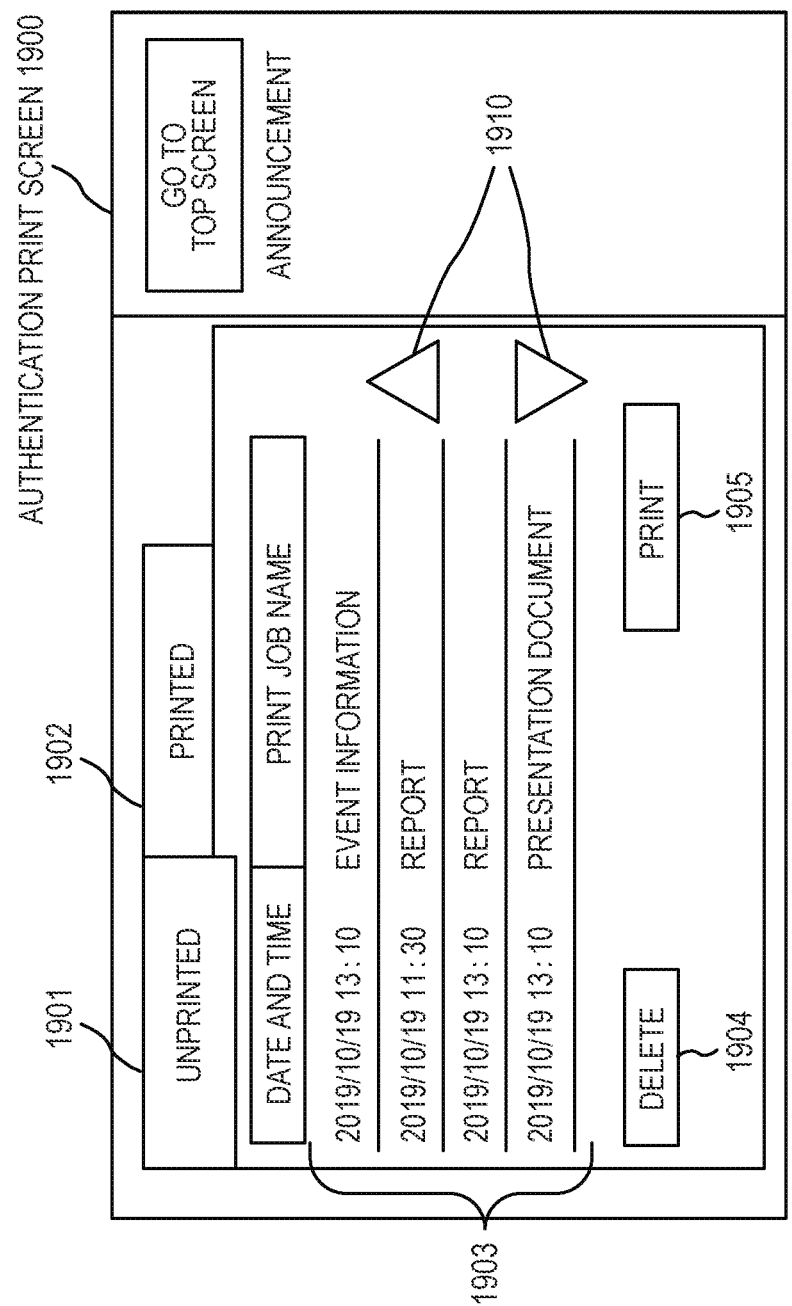
FIG. 17 illustrates an example showing an authentication print screen.

FIG. 17 illustrates a diagram showing an example of a screen for a user to use an authenticated print function in the image forming apparatus 111. If the user presses the authentication print button 1305 or the notification 1307 of the notification information display area 1308 on the top screen 1300 as shown in FIG. 12, the job display unit 503 displays an authentication print screen 1900.

The authentication print screen 1900 includes an unprinted tab 1901, a printed tab 1902, a display are 1903, a delete button 1904, a print button 1905, and scroll buttons 1910. The unprinted tab 1901 controls to display unprinted print jobs. The printed tab 1902 controls to display printed print jobs. The display area 1903 is an area (area for displaying a job list) where information (job information) of print jobs is displayed in a scrollable list. In the display area 1903, the user can scroll the screen by operating the scroll buttons 1910 to confirm the entire list of job information.

If the unprinted tab 1901 is selected, the job display unit 503 acquires, from the stored print job list 1000, and displays information of the print job in which the login user matches the user ID 1001 and the printed flag 1003 indicates "OFF" in the display area 1903. If the printed tab 1902 is selected, the job display unit 503 acquires, from the stored print job list 1000, and displays information of the print job in which the login user matches the user ID 1001 and the printed flag 1003 indicates "ON" in the display area 1903.

The delete button 1904 deletes the print job selected in the display area 1903. The print button 1905 prints the print job selected in the display area 1903.

Figure 18:
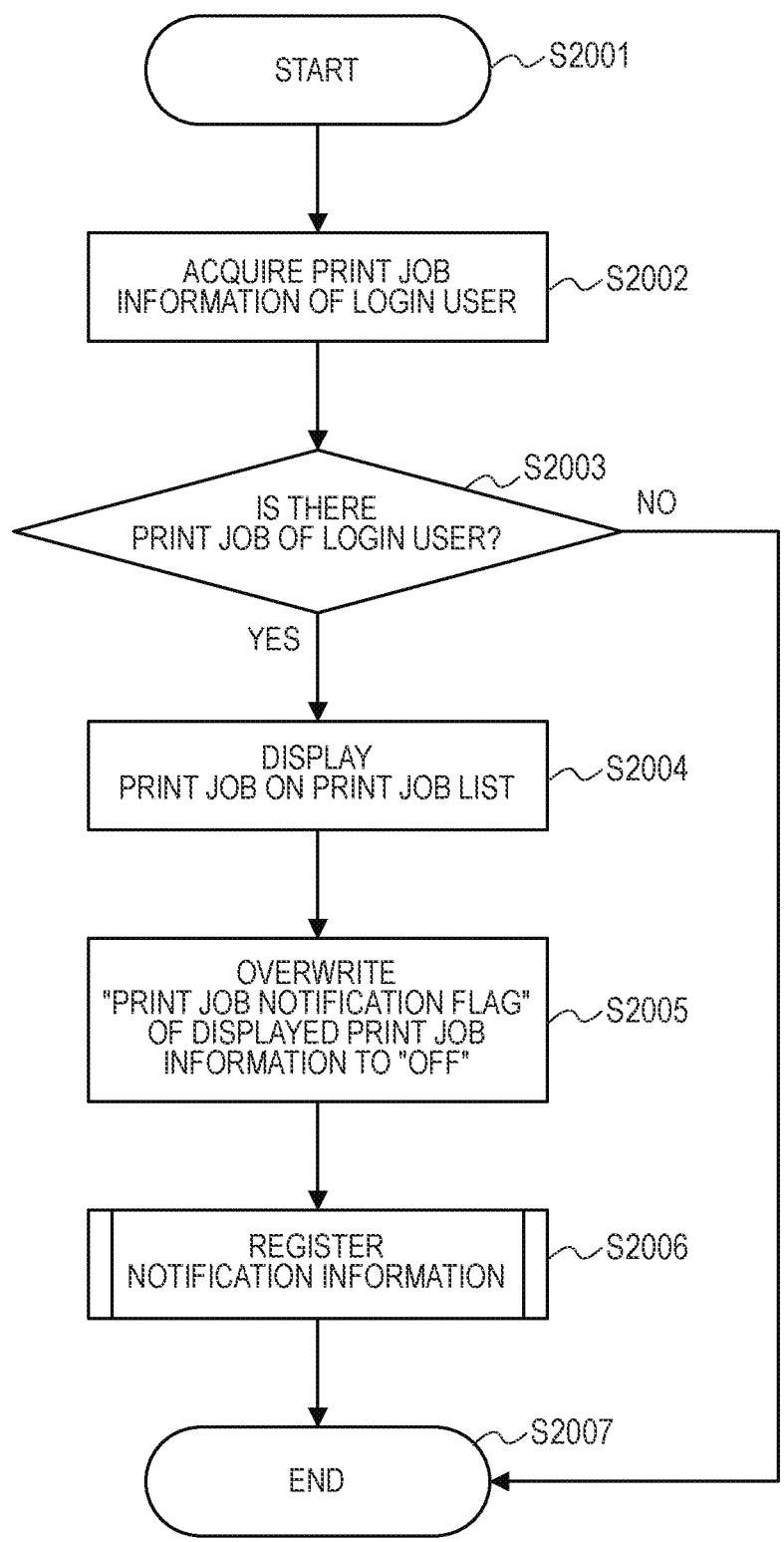
FIG. 18 illustrates a flowchart showing display processing of a print job list on the authentication print screen.

FIG. 18 illustrates a flowchart showing the processing performed if the job display unit 503 displays the authentication print screen 1900. The processing of the flowchart is realized by the CPU 301 reading and executing a program corresponding to the software 500 stored in the auxiliary storage device 303 or the like into the RAM 302.

If the user presses the authentication print button 1305 or the notification 1307 in the notification information display area 1308 of the top screen 1300, the processing of the flowchart starts (step S2001).

In step S2002, the job display unit 503 acquires job information from the stored print job list 1000, in which the login user matches the user ID 1001. In step S2003, the job display unit 503 determines whether or not there is print job information of the login user. If there is no print job information for the login user (No in step S2003), the job display unit 503 terminates the processing of the flowchart (step S2007).

On the other hand, if there is job information of the login user (Yes in step S2003), the job display unit 503 advances the process to step S2004. In step S2004, the job display unit 503 displays the print job information in the display area 1903.

In step S2005, the job notification unit 504 overwrites the print job notification flag 1004 of the print job information displayed by the job display unit 503 to "OFF". At this time, only the print job notification flag 1004 of the print job information displayed in a visible manner by the user shall be turned to "OFF". That is, with respect to the print job information that can be viewed only by scrolling the display area 1903 by operating the scroll button 1910, the print job notification flag 1004 shall be turned to "OFF" if the print job information becomes visible by scrolling.

In step S2006, the job notification unit 504 performs the registration processing of the notification information shown in FIG. 13 and terminates the processing of the flowchart (step S2007).

As described above, by performing the registration processing of notification information in step S2006, the job notification unit 504 can manage the notification information 1500 in the latest state. In the present embodiment, the print job notification flag 1004 is set to "OFF" if the print job information is displayed in the display area 1903, but the print job notification flag 1004 may be set to "OFF" if the information is displayed on the top screen 1300 as shown in the example of notification 1307.

In step S2005, only the print job notification flag 1004 of the print job information displayed in the display area 1903 is overwritten to "OFF", but the print job notification flag 1004 of all the print job information may be overwritten to "OFF". In other words, the print job notification flag 1004 may be turned to "OFF" at the timing of step S2005 for the print job information that is not visible at the timing of step S2005 but becomes visible only by scrolling the display area 1903 by operating the scroll button 1910. This processing is described below with reference to FIG. 20.

Another Embodiment for the Display Processing of the Print Job List

FIG. 20 illustrates a flowchart showing other examples of processing if the job display unit 503 displays the authentication print screen 1900. The processing of the flowchart is realized by the CPU 301 reading and executing a program corresponding to the software 500 stored in the auxiliary storage device 303 or the like into the RAM 302.

The processing shown in FIG. 20 includes step S2305 instead of step S2005 of FIG. 18. Steps S2301 to S2304 and S2306 are the same processing as steps S2001 to S2004 and S2006 shown in FIG. 18, so their descriptions are omitted. In step S2305, the job notification unit 504 overwrites the print job notification flag 1004 of all the print job information of the login users to "OFF".

Figure 19A:
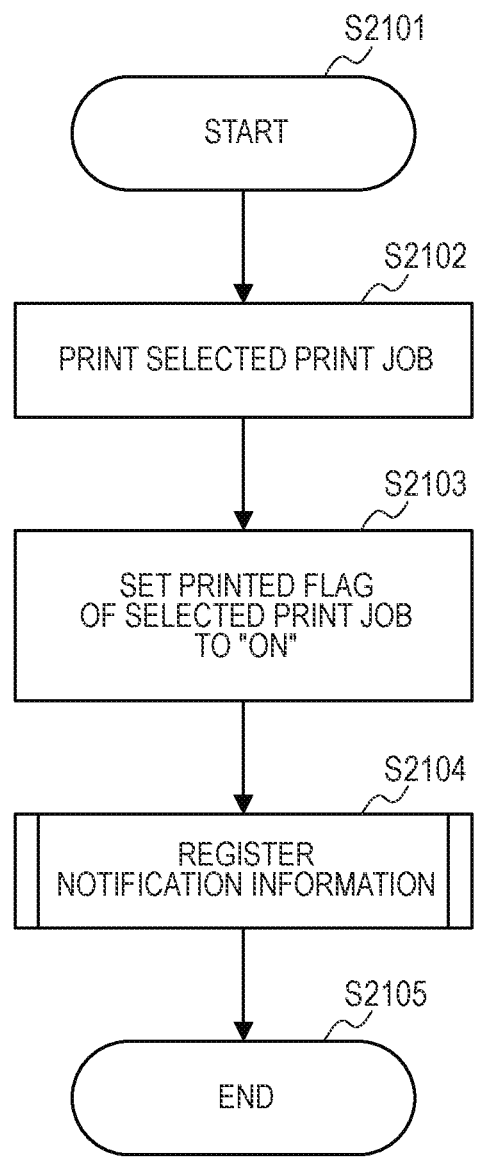
FIG. 19A illustrates a flowchart showing the print processing of the print job on the authentication print screen.

FIG. 19A illustrates a flowchart showing the processing if the user selects a print job and presses the print button 1905 on the authentication print screen 1900. The processing of the flowchart is realized by the CPU 301 reading and executing a program corresponding to the software 500 stored in the auxiliary storage device 303 or the like into the RAM 302.

If the user selects the print job and presses the print button 1905 on the authentication print screen 1900, the processing of this flowchart starts (step S2101). In step S2102, the job management unit 502 prints the selected print job using the printer device 307 of the image forming apparatus 111.

In step S2103, the job notification unit 504 turns the printed flag 1003 corresponding to the print job printed in step S2102 to "ON". In step S2105, the job notification unit 504 performs the registration processing of the notification information shown in FIG. 13 and terminates the processing of the flowchart (step S2105). As described above, by performing the registration processing of notification information in step S2104, the job notification unit 504 can manage the notification information 1500 in the latest state.

Figure 19B:
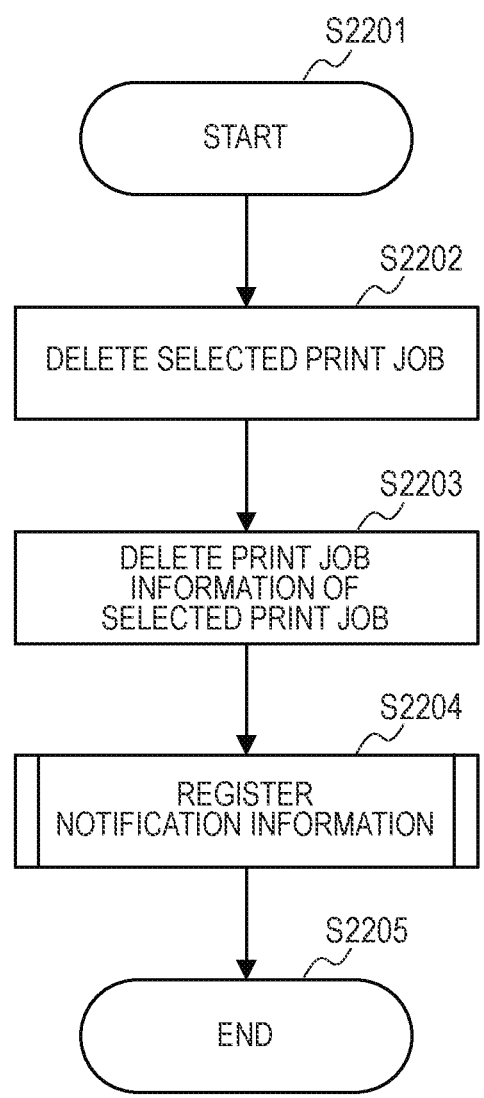
FIG. 19B illustrates a flowchart showing the delete processing of the print job on the authentication print screen.

FIG. 19B illustrates a flowchart showing the processing if the user selects the print job and presses the delete button 1904 on the authentication print screen 1900. The processing of the flowchart is realized by the CPU 301 reading and executing a program corresponding to the software 500 stored in the auxiliary storage device 303 or the like into the RAM 302.

If the user selects the print job and presses the delete button 1904 on the authentication print screen 1900, the processing of this flowchart starts (step S2201). In step S2202, the job management unit 502 deletes the selected print job from the auxiliary storage device 303 of the image forming apparatus 111.

In step S2203, the job management unit 502 deletes the print job information of the print job deleted in step S2202 from the stored print job list 1000. In step S2204, the job notification unit 504 performs the registration processing of the notification information shown in FIG. 13 and terminates processing of this flowchart (step S2205). As described above, by performing the registration processing of notification information in step S2204, the job notification unit 504 can manage the notification information 1500 in the latest state.

Thus, it is possible to notify the user that there is a newly arrived print job only if there is a print job that has not been confirmed by the user since the print job was stored in the image forming apparatus. The notification conditions can also be changed to notify the user that there is a print job that has not been printed only when there is a print job that has not been printed by the user since the print job was stored in the image forming apparatus.

As described above, the present embodiment notifies the user that there is a print job only if the retained print job has a new arrival status that the user has never confirmed. Thus, in the retained print system, the user can be efficiently notified that there is a retained print job. That is, the user can recognize that there is a print job only if there is an unconfirmed print job. In this way, a print job that has been confirmed once is not displayed as notification information (the notification 1307) even if the print job is not printed so that the user does not have to make a useless confirmation, which improves usability.

Therefore, it becomes possible for the user to effectively notify the user that there is an unconfirmed print job without over-notification or under-notification, thereby reducing the annoyance caused by over-notification and improving usability.

According to the above-described embodiment, it becomes possible for the user to effectively notify the user that there is an unconfirmed print job without over-notification or under-notification, thereby reducing the annoyance caused by over-notification and improving usability. As a result, the user can recognize that there is a print job only if there is an unconfirmed print job.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-026525, filed Feb. 24, 2022, which is hereby incorporated by reference herein in its entirety.

What is claimed is:

1. An image forming apparatus comprising:
a display unit;
one or more memories; and
one or more processors that execute instructions to:
store a plurality of print jobs in the one or more memories;
notify a user that the plurality of print jobs is stored by displaying notification information on the display unit;
display job information about the plurality of print jobs stored in the one or more memories on the display unit; and
manage whether or not the job information is displayed for each of the plurality of print jobs,
wherein the notification information is displayed if a print job of which the job information has not been displayed is stored in the one or more memories, and
wherein the notification information is not displayed if a print job of which the job information has not been displayed is not stored in the one or more memories.

2. The image forming apparatus according to claim 1, wherein the job information is displayed as a scrollable list, and
wherein the print job displayed on the display unit is managed as a print job of which the job information has been displayed.

3. The image forming apparatus according to claim 1, wherein the job information is displayed as a scrollable list, and
wherein the print job included in the scrollable list is managed as a print job of which the job information has been displayed.

4. The image forming apparatus according to claim 1, wherein the notification information is displayed as information including the number of the print jobs of which the job information has not been displayed.

5. The image forming apparatus according to claim 1, wherein the one or more processors further execute instructions to set a print job specified by the notification information as a first print job of which the job information has not been displayed or a second print job of which the job information has not been printed,
wherein, in a case where the first print job is set, the notification information is displayed if a print job of which the job information has not been displayed is stored in the one or more memories, and the notification information is not displayed if a print job of which the job information has not been displayed is not stored in the one or more memories,
wherein, in a case where the second print job is set, the notification information is displayed if a print job that has not been printed is stored in the one or more memories, and the notification information is not displayed if a print job that has not been printed is not stored in the one or more memories.

6. The image forming apparatus according to claim 1, wherein a print job that has been printed is managed as a print job of which the job information has been displayed.

7. The image forming apparatus according to claim 1, wherein the notification information is displayed for the print job corresponding to the user logging in.

8. A method for controlling an image forming apparatus, the method comprising:
notifying a user that a plurality of print jobs is stored in one or more memories by displaying notification information on a display unit;
displaying job information about the plurality of print jobs stored in the one or more memories on the display unit; and
in response to the job information being displayed, storing identification information of each of the plurality of print jobs of which the job information has been displayed,
wherein the notification information is displayed if a print job of which the job information has not been displayed is stored in the one or more memories, and
wherein the notification information is not displayed if a print job of which the job information has not been displayed is not stored in the one or more memories.

9. The method according to claim 8,
wherein the job information is displayed as a scrollable list, and
wherein the print job displayed is managed as a print job of which the job information has been displayed.

10. The method according to claim 8,
wherein the job information is displayed as a scrollable list, and
wherein the print job included in the scrollable list is managed as a print job of which the job information has been displayed.

11. The method according to claim 8,
wherein the notification information is displayed as information including the number of the print jobs of which the job information has not been displayed.

12. The method according to claim 8, further comprising:
setting a print job specified by the notification information as a first print job of which the job information has not been displayed or a second print job of which the job information has not been printed,
wherein, in a case where the first print job is set, the notification information is displayed if a print job of which the job information has not been displayed is stored in the one or more memories, and the notification information is not displayed is not displayed if a print job of which the job information has not been displayed is not stored in the one or more memories,
wherein, in a case where the second print job is set, the notification information is displayed if a print job that has not been printed is stored in the one or more memories, and the notification information is not displayed if a print job that has not been printed is not stored in the one or more memories.

13. The method according to claim 8, wherein a print job that has been printed is managed as a print job of which the job information has been displayed.

14. The method according to claim 8, wherein the notification information is displayed for the print job corresponding to the user logging in.

15. A non-transitory computer-readable storage medium storing one or more programs including executable instructions to cause a computer to perform a method of controlling an image forming apparatus, the method comprising:
- notifying a user that a plurality of print jobs is stored in one or more memories by displaying notification information on a display unit;
- displaying job information about the plurality of print jobs stored in the one or more memories on the display unit; and
- in response to the job information being displayed, storing identification information of each of the plurality of print jobs of which the job information has been displayed,
- wherein the notification information is displayed if a print job of which the job information has not been displayed is stored in the one or more memories, and
- wherein the notification information is not displayed if a print job of which the job information has not been displayed is not stored in the one or more memories.

* * * * *